United States Patent
Bates et al.

(10) Patent No.: US 9,110,154 B1
(45) Date of Patent: Aug. 18, 2015

(54) PORTABLE PROGRAMMABLE LADAR TEST TARGET

(71) Applicant: Raytheon Company, Waltham, MA (US)

(72) Inventors: Kenn S. Bates, Lakewood, CA (US); Robert L. Peirce, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/184,676

(22) Filed: Feb. 19, 2014

(51) Int. Cl.
*G01S 7/486* (2006.01)
*G01C 3/08* (2006.01)
*G01S 7/497* (2006.01)
*G01S 17/08* (2006.01)
*G01S 17/10* (2006.01)

(52) U.S. Cl.
CPC .............. *G01S 7/497* (2013.01); *G01S 17/08* (2013.01); *G01S 7/4865* (2013.01); *G01S 17/102* (2013.01)

(58) Field of Classification Search
USPC ................ 356/4.01, 5.01, 3.01, 5.05, 5.15; 250/214 R, 339.1
See application file for complete search history.

(56) References Cited

U.S. PATENT DOCUMENTS

| | | | |
|---|---|---|---|
| 8,399,872 B2 | 3/2013 | Bates et al. | |
| 8,629,975 B1* | 1/2014 | Dierking et al. | 356/4.01 |
| 2004/0051859 A1* | 3/2004 | Flockencier | 356/4.01 |
| 2006/0007422 A1* | 1/2006 | Dimsdale | 356/5.04 |
| 2006/0197936 A1* | 9/2006 | Liebman et al. | 356/5.01 |
| 2007/0177841 A1* | 8/2007 | Danziger | 385/28 |
| 2011/0272559 A1* | 11/2011 | Woolaway et al. | 250/214 R |
| 2013/0128257 A1* | 5/2013 | Stettner et al. | 356/4.01 |

* cited by examiner

*Primary Examiner* — Sang Nguyen

(57) ABSTRACT

A method of testing a Laser Detection and Ranging (LADAR) or LIght Detection And Ranging (LiDAR) system includes receiving an input signal from the LADAR/LiDAR and triggering light/laser sources to output pulses. The method includes transmitting the light/laser pulses into a first end of two or more fiber optical delay lines. The method includes transmitting the pulses throughout a length of two or more fiber optical delay lines. The method includes after a delay time corresponding to the length of the fiber optical delay lines, transmitting the pulses out through a second end of the fiber optical delay lines arranged within a target plane. The pulses output yield a return signals transmission from the target plane to the LADAR/LiDAR. The return signal transmission is delayed by times for the light/laser pulses to traverse the length of the fiber optical delay lines.

22 Claims, 4 Drawing Sheets

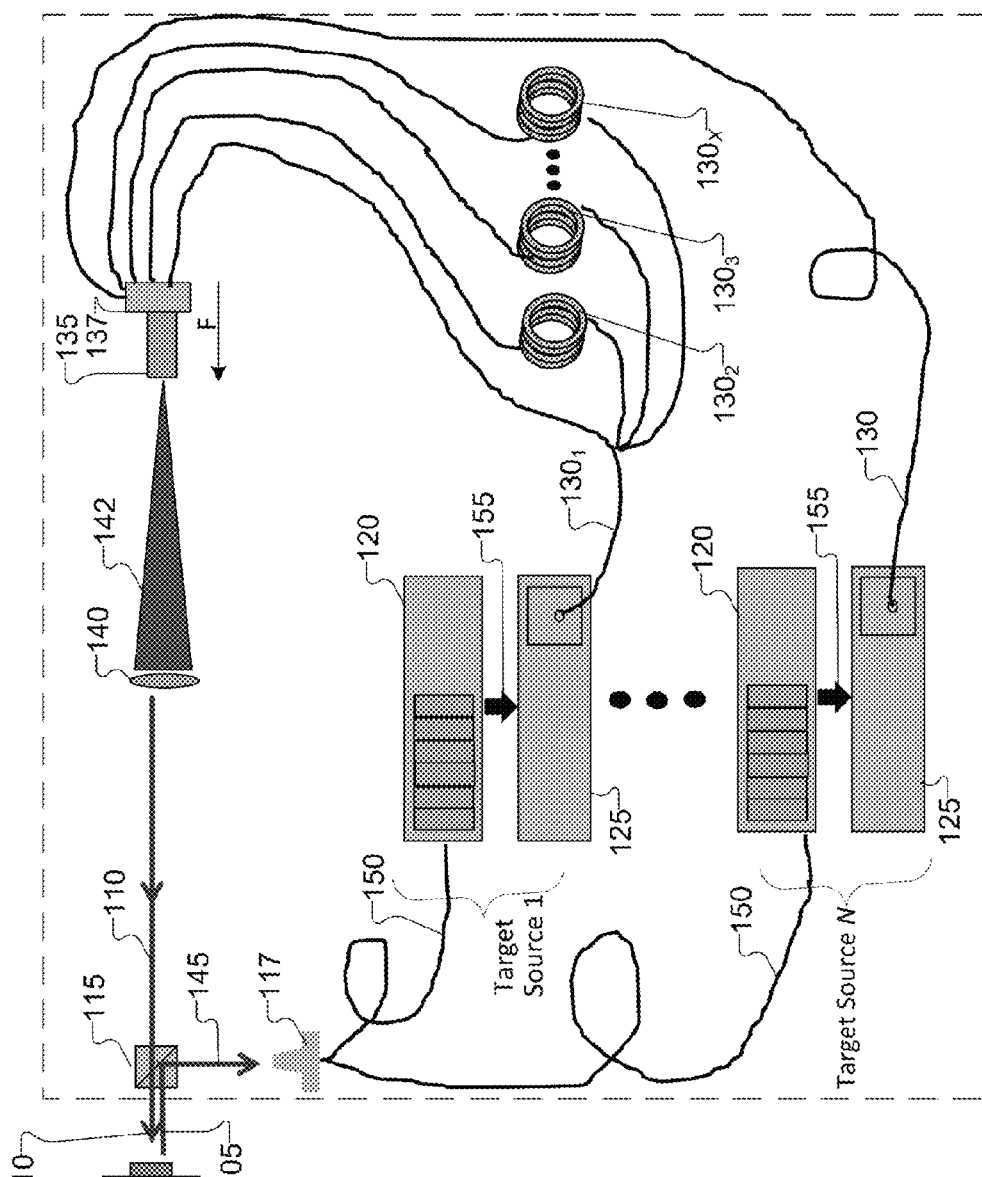
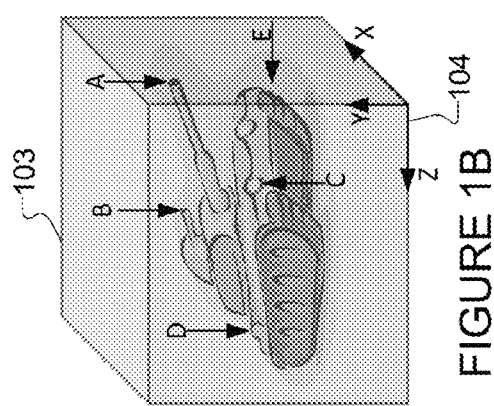
FIGURE 1A
FIGURE 1B

PORTABLE PROGRAMMABLE LADAR TEST TARGET

TECHNICAL FIELD

The present disclosure is directed in general to testing equipment for laser and light ranging systems and more specifically to systems and methods testing Laser Detection and Ranging (LADAR) or Light Detection And Ranging (LIDAR) systems.

BACKGROUND OF THE DISCLOSURE

Ranging is a process of determining the distance from one position to another position. The various types of ranging systems (namely, RAdio Detection And Ranging (RADAR), LIght Detection And Ranging (LiDAR), and LAser Detection And Ranging (LADAR)) transmit and receive electromagnetic energy. The ranging system (also referred to as "rangefinder" or "ranging equipment") includes a signal generator and transmitter that transmit an electromagnetic signal to a targeted object. The electromagnetic signal interacts with the targeted object, which reflects a portion of the electromagnetic signal. The ranging system includes a receiver that receives the reflected electromagnetic signal and transforms the captured energy into an electrical signal that can be processed by a signal processor. The ranging systems are connected to a computer or other electrical signal processing circuitry that extracts desired information. The computer also includes a high frequency clock that measures the time elapsed between the time the transmitter transmitted the electromagnetic signal and the time the receiver received the reflected electromagnetic signal. The computer uses the time elapsed to calculate the distance from the ranging system to the targeted object. For example, if the object is to be a target of gun firing, then based upon the return range output from the rangefinder, the computer can use laws of ballistics to determine the angle at which to set a gun barrel in order to impact the targeted object.

There are several methods and test equipment to test a rangefinder. One solution is an outdoor range technique that uses an outdoor range and a real target object (e.g., target board). The outdoor range technique includes opening a window to an outdoor range; firing a laser signal to a target (e.g., target board) that is disposed across the range at a distance away, such as 500 to 1000 meters away; receiving reflected laser signals from the reflection off the surface of the target; measuring the elapsed time between transmission and reception of the laser signals; and calculating the distance to the target using the elapsed time. The techniques for testing the rangefinder provide the rangefinder with one-dimensional information, namely the elapsed time in the time dimension.

Similarly for testing LADAR or LiDAR, the outdoor range technique can be utilized, where the target board is replaced by a real world target with depth, sometimes moving, or several targets in different locations and ranges. Similarly, large indoor facilities can accomplish LADAR/LiDAR testing via scaled down versions of the outdoor test facilities using giant collimators. However, small laboratory or portable indoor LADAR/LiDAR testing is currently limited to one dimensional targets at one range similar to laser rangefinder testing. Otherwise, compact indoor LADAR/LiDAR testing is limited to indoor testing of LADAR/LiDAR components via methods such as indoor testing of detector responsivity, detector noise, optical output power, uniformity, and boresight. There currently is a lack of LADAR/LiDAR system testing techniques that can be implemented using portable or small laboratory indoor LADAR/LiDAR test equipment, which is what this patent addresses.

SUMMARY OF THE DISCLOSURE

To address one or more of the above-deficiencies of the prior art, one embodiment described in this disclosure provides a method of testing a Laser Detection And Ranging (LADAR) system or Light Detection And Ranging (LiDAR) system includes receiving an input signal from the LADAR or LiDAR system and triggering a laser diode or other light source to output a light pulse. The method includes transmitting the light pulse into a first end of the fiber optical delay line. The method includes transmitting the light pulse throughout a length of the fiber optical delay line. The method includes after a delay time corresponding to the length of the fiber optical delay line, transmitting the light pulse out through a second end of the fiber optical delay line arranged within a target plane. The light pulse output yields a return signal transmission from the target plane to the LADAR or LiDAR system. The return signal transmission is delayed by time for the light pulse to traverse the length of the fiber optical delay line. The method includes electronically delaying the input signal with two or more delay timers to create electronic delays, which augment the delays from the two or more fiber optic delay lines. The method includes optically isolating the target plane composed of the second end of the fiber optic delay lines. The method includes rotation or translation of the target plane to angularly displace the targets with respect to the LADAR or LiDAR line of sight.

Certain embodiments may provide various technical advantages depending on the implementation. For example, certain embodiments provide a return signal transmission including outputs from multiple fiber optical delay lines of different lengths corresponding to different ranges, which together correlate to a three dimensional object. Certain embodiments simulate an unsmooth or non-flat surfaced target to the LADAR or LiDAR. Certain embodiments utilize an electronically programmable delay adding to the fiber optic target spool(s) delay which determines the total delay or range. Certain embodiments utilize one or two rotation devices or a scanner device on the target plane to create different line of sight (LOS) angles for the returned light pulses into the LADAR/LiDAR. This can also be accomplished with linear stages on the target plane and a fixed collimator lens. This is all to enable the generation of LADAR/LiDAR targets at different angular positions within the field of view. For sufficiently quick rotary stages or scanners or position stages, several targets can be generated almost simultaneously at different positions and ranges within the LADAR or LiDAR field of view. Certain embodiments return different intensities over the target field of view.

Although specific advantages have been enumerated above, various embodiments may include some, none, or all of the enumerated advantages. Additionally, other technical advantages may become readily apparent to one of ordinary skill in the art after review of the following figures and description.

The scope of this patent applies to a test target for Laser Detection And Ranging (LADAR) of either coherent or Geiger mode types or generic LADAR types. As well, a test target for LIght Detection And Ranging (LiDAR) systems is also covered within the scope as long as multiple ranging or some imaging is also performed.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1A illustrates a portable programmable LAser Detection And Ranging (LADAR) or LIght Detection And Ranging (LiDAR) test target including a hybrid electronic Simulated Optical Range Target (e-SORT) according to embodiments of the present disclosure;

FIG. 1B illustrates a three dimensional (3-D) representation of a LADAR or LiDAR test target as perceived by the LADAR/LiDAR according to embodiments of the present disclosure;

DETAILED DESCRIPTION

Figure 2:
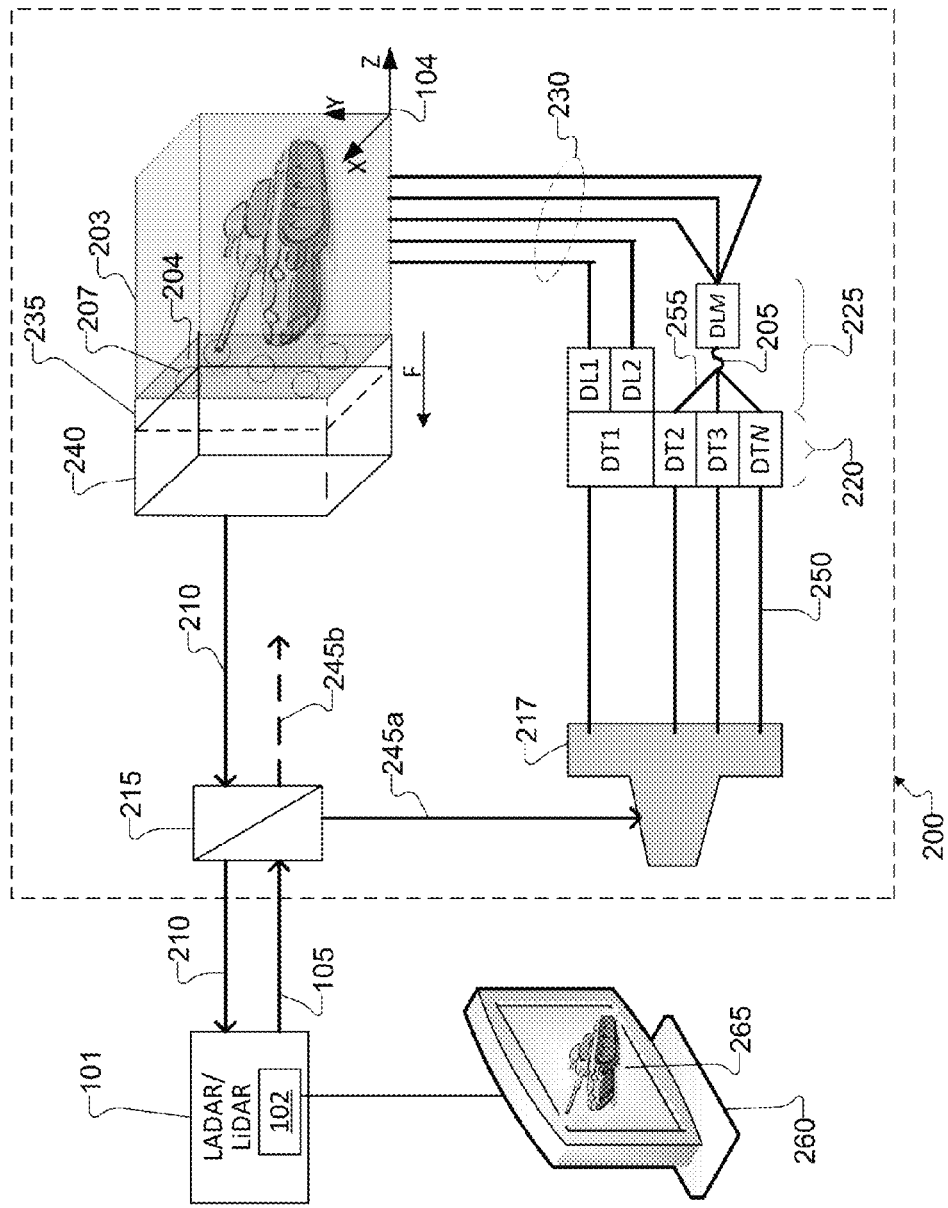
FIG. 2 illustrates a portable programmable LADAR/LiDAR test target including a hybrid electronic Simulated Optical Range Target (e-SORT) composed of multiple delay timers and laser/light sources without fiber optic delay spools according to embodiments of the present disclosure.

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

The following document is hereby incorporated into the present disclosure as if fully set forth herein: (i) U.S. Pat. No. 8,399,872 (hereinafter "REF1").

There are a few methods and test equipment to test a rangefinder using a simulated targeted object. One solution is a simulated range technique using a simulated optical range target (SORT). The simulated optical range target (SORT) includes a lens, a spool of fiber optical delay line with a mirror at the end of the line. Laser energy is transmitted into the lens. The lens focuses the laser energy into a first end of the fiber optical delay line. The laser energy travels from the first end of the fiber optical delay line to the second end of the fiber delay line, which terminates at a mirror/reflective-lens. The mirror reflects the laser energy back through the fiber optical delay line. When the reflected laser energy reaches the first end of the fiber optical delay line, the reflected laser energy emits from the first end with a delay time and attenuation that simulate the return. The return signal travels into the receiver of the rangefinder. The rangefinder determines the distance to the targeted object based on the elapsed time. The length of the fiber optical delay line determines the amount of delay between the time the laser energy is received into the lens and the time the reflected laser energy is transmitted out of the fiber optical delay line toward the receiver.

Another solution is a simulated range technique using an electronic simulated optical range target (e-SORT). The e-SORT includes a sensor, a laser diode, and a delay timer. The sensor senses when a laser pulse is transmitted (for example, a laser flash) from the ranging equipment transmitter. The delay timer simulates the travel time of the laser pulse from the transmitter, to a targeted object, and back to the receiver of the rangefinder. That is, delay timer receives user selections of a target disposed 500 meters, 1 kilometer, or other distance away from the rangefinder. The delay timer determines a simulated delay time, based on the selection. The simulated delay time can be the equivalent time that would elapse between the time the laser pulse is transmitted toward the target and the time a reflected laser pulse would be received by the receiver of the rangefinder from the surface of the target disposed a selected distance away from the rangefinder. The simulated delay time can be the equivalent time that would elapse between the time the laser pulse is transmitted into the first end of a spool having a selected length of fiber optical delay line and the time a reflected laser pulse would be transmitted out of the second end of the spool of fiber optical delay line. In response to receiving a signal from the sensor indicating that a laser pulse was transmitted from the ranging equipment transmitter, the delay timer sends a control signal to the laser diode after the simulated delay time has elapsed. In response to receiving the control signal from the delay timer, the laser diode transmits a laser light signal through a fiber optical line into the receiver of the rangefinder. The rangefinder determines the distance to the targeted object using the signal received from the laser diode.

The outdoor range technique, the simulated range technique using a simulated optical range target (SORT), and the simulated range technique using an electronic simulated optical range target (e-SORT) provide the rangefinder with one-dimensional information, namely the elapsed time in the time dimension which represents range.

FIG. 1A illustrates a portable programmable LAser Detection And Ranging (LADAR) or LIght Detection And Ranging (LiDAR) test target including a hybrid electronic Simulated Optical Range Target (e-SORT) according to embodiments of the present disclosure. The portable programmable LADAR/LiDAR test target 100 simulates a real targeted object disposed at a distance from a LADAR/LiDAR 101. More particularly, during testing of the LADAR/LiDAR 101, the LADAR/LiDAR 101 perceives one or more three dimensional (3D) objects, such as the tank represented in FIG. 1B, based on the laser return signals that the portable programmable LADAR/LiDAR test target 100 transmits to a receiver of the LADAR/LiDAR 101. The portable programmable LADAR/LiDAR test target 100 shown in FIG. 1A is for illustration only. Other embodiments could be used without departing from the scope of this disclosure. The portable programmable LADAR/LiDAR test target 100 can be used in civilian applications, such as in testing sports equipment that determines distance to a golf course flag or testing equipment that determines distance from a house to a wind turbine. The portable programmable LiDAR test target 100 can be used to test a LiDAR that is used to analyze gases emitted from smoke stacks. The portable programmable LADAR test target 100 can be used to test commercial LADAR systems that are used to develop databases for 3-dimensional computer models (e.g., 3D renditions of rooms, buildings, other architecture).

The LADAR/LiDAR 101 includes a signal generator and a transmitter that transmit an electromagnetic signal 105 to a targeted object. For example, the LADAR/LiDAR can transmit a sequence of light pulses to the targeted object. The electromagnetic signal 105 output from the LADAR/LiDAR 101 is also referred to as "laser flash" 105 or "laser pulse" 105 or "light flash" 105 or "light pulse" 105. The laser pulse 105 interacts with the targeted object, which returns an electromagnetic signal 110 back toward the LADAR/LiDAR 101. For example, when the targeted object is a real object (e.g., a tank, bicycle, ladder, human body), the light pulse 105 incident upon the targeted object illuminates the surface of the real object, and the real object reflects a portion of the light or laser energy back toward the LADAR/LiDAR 101. The reflected light or laser energy is the return electromagnetic signal 110, which can be referred to as a "reflected signal" or "return signal." For the remainder of this description LADAR can be used to stand for a LADAR system or LiDAR system, and laser pulse or laser light or laser flash or laser energy could also mean a light source or light pulse or light flash. As well, laser diode or diode laser can also mean light diode or light source, respectively.

The LADAR 101 includes a receiver that receives the reflected electromagnetic signal and transforms the captured energy into an electrical signal that can be processed by a signal processor. The LADAR 101 can be connected to a computer or other electrical signal processing circuitry that extracts desired information. The LADAR 101 can even include electrical signal processing circuitry 102 that extracts desired information from the LADAR receiver. The computer or electrical signal processing circuitry 102 includes a high frequency clock that measures the time elapsed between the time the transmitter transmitted the electromagnetic signal and the time the receiver received the reflected electromagnetic signal. The computer or electrical signal processing circuitry 102 uses the time elapsed to calculate the distance to the targeted object.

For example, the electromagnetic signal 105 can be a single wide-angle laser pulse. When the wide-angle laser pulse is incident upon a non-flat surface of a real object, various portions of the surface of the real object reflect the laser energy at different times and at different levels of intensity. That is, the return signal 110 can include multiple return signals, each having an intensity level and a delay time corresponding to the reflection point on surface of the real object. The computer or electrical signal processing circuitry 102 perceives the collection of the multiple return signals 110 as reflections from a 3-dimensional (3D) object.

FIG. 1B illustrates an example 3-dimensional (3D) virtual target according to embodiments of the present disclosure. The target 103 shown is for illustration only. Other embodiments could be used without departing from the scope of this disclosure. The target 103 in FIG. 1B includes one field target, an armored tank with gun barrels and headlamps facing the receiver of the LADAR as a virtual target in that it exists physically only in the perception of the LADAR. This virtual target is created by a flat 2-dimensional array of fiber optics with range delays as shown in FIGS. 4A-4F.

According to other solutions for testing the ability of the LADAR 101 to determine the distance (e.g., 500 meters away) to the field target, such as in outdoor testing, the LADAR 101 receives a number of reflected return signals corresponding to various reflection points on the surface of the tank. The receiver of the LADAR receives the reflected signals at points in x-y-z coordinate system 104 relative to the LADAR. Each reflected return signal has a delay time (t) as a function of the z coordinate, an intensity level (i), an x-y-z coordinate corresponding to the horizontal, vertical, and depth distances from the LADAR receiver. The LADAR may receive five (5) reflected return signal informations from a first position A ($x_A$, $y_A$, $z_A$, $t_A$, $i_A$) at the front most point on the long barrel gun, a second position B ($x_B$, $y_B$, $z_B$, $t_B$, $i_B$) at the front most point on the short barrel gun, at a third position C ($x_C$, $y_C$, $z_C$, $t_C$, $i_C$) at a front headlamp, a fourth position D ($x_D$, $y_D$, $z_D$, $t_D$, $i_D$) on the rear body, and a fifth position E ($x_E$, $y_E$, $z_E$, $t_E$, $i_E$) on the caterpillar tracks. The time $t_A$ would have a shorter delay than $t_B$, which would have a shorter delay that $t_D$, accordingly, the depth component $z_E$ of the fifth point would be closer to the LADAR 101 than the depth component $z_E$ of the fourth point. The vertical component $y_C$ of the third position may be lower than the vertical component $y_D$ of the fourth point.

The LADAR test method according to present disclosure uses the portable programmable LADAR test target 100 to represent the field target as a set of points within the target 103. The target 103 represents a set of points in the field of view of the LADAR. For the purpose of explanation, the target 103 is shown as a box that has a front face (also referred to as a "target plane") facing the LADAR 101 and could be located at position 137. Any return signal appearing to come from any point in the set of points within the target 103 passes through the front face of the target 103 before being detected by the receiver of the LADAR 101. That is, a return signal emitted from the target plane 137 can represent a return signal sent from any point in the set of points within target 103. More particularly, the first through fifth points A-E of the armored tank can be represented by light emitted from a particular point in the target plane. The target plane is shown as the x-y plane according to the coordinate system 104. For example, the first point A can be represented by a return signal characterized by the reflected return signal information: ($x_A$, $y_A$, $t_A$, $i_A$), enabling the LADAR 101 to determine the range $z_A$.

In FIG. 1A, the portable programmable LADAR test target 100 includes a beam splitter 115; a detector 117; one or more delay timers 120, one or more sources 125 of light, and one or more fiber optic cables 130; a Faraday isolator 135; and a collimator 140. For ease of description, in this disclosure, the sources 125 of light are referred to as diode lasers 125, but can be any light source that can drive light into the fiber optic cables 130 (for example, a light diode, laser source, macro laser source, or laser diode. The electromagnetic signal 105 output from the LADAR 101 is the input signal of the test target 100. In response to receiving the electromagnetic signal 105, the test target 100 causes the LADAR 101 to perceive a number P of field target points. The number P can represent one or multiple field target points. For example, the target 103 can include multiple field targets, such as a collection of a ladder, a utility pole, and a bicycle. Each field target point can be made to appear to be a different distance away from the LADAR 101 and located at a different position in the LADAR 101 field of view. Consequently, so can each field target.

The beam splitter 115 receives the laser pulse 105 from the LADAR 101. The beam splitter 115 can include a mirror or prism that divides a beam of light into multiple paths by reflecting a part of the beam. The beam splitter 115 reflects a first portion of the laser pulse 105 along a path into the detector 117. That is, the detector 117 receives an optical signal 145 including the first portion of the laser pulse from the detector through the beam splitter 115. A second portion of laser energy from the laser pulse 105 is not reflected into the detector 117, but instead passes through the beam splitter 115 along a path into the collimator 140.

The Faraday isolator 135 is an optical device that provides one-way transmission of light. The Faraday isolator 135 includes a front side and a back side and permits light to travel in a forward direction (shown by the arrow F) through the Faraday isolator 135. That is, light input from the back side travels through the Faraday isolator 135 and is output from the front side with only minimal attenuation. Faraday isolator 135 prevents the laser pulse 105 from entering the fiber optic cables 130 by blocking the LADAR 101 laser energy 105 (for example, the second portion of the laser pulse 105) from the front face of the target 103 at the back side of the Faraday isolator 135. That is, the Faraday isolator 135 receives the non-reflected portion of the laser pulse 105 from the collimator 140 and into the front side, but the Faraday isolator 135 will highly attenuate the received signal and not transmit through to the back side of the Faraday isolator 135. The Faraday isolator attenuates signals propagating in the reverse direction (antiparallel to the direction F). The Faraday isolator 135 includes a one or more inputs at the back side corresponding to target plane 137. As shown in the example of FIG. 1, the back side of the Faraday isolator 135 is coupled to the target plane 137, which includes five fiber optic cables 130.

Detector 117 includes a pulse detector that detects when the LADAR 101 laser flashed. The detector 117 receives the first portion of the input signal 105 (namely, the optical signal 145), and in response, sends a trigger signal 150 to cause the portable programmable LADAR test target 100 to generate a return signal 110 transmission corresponding to each field target. That is, the detector 117 is configured to in response to receiving a first optical signal 145 from a LADAR 101, transmit a trigger signal 150 to cause a laser diode 125 to emit a laser pulse which travels through fiber optics 130 through target plane 137 and Faraday isolator 135 to return as return signal 110. In certain embodiments, the detector 117 is configured to in response to receiving a first optical signal 145 from a LiDAR 101, transmit a trigger signal 150 to cause a light diode 125 to emit a light pulse which travels through fiber optics 130 through target plane 137 and Faraday isolator 135 to return as return signal 110.

The portable programmable LADAR test target 100 can cause the LADAR 101 to perceive P of field target points. Each field target representation is generated by a number N of delay timers 120 coupled to a number of M diode lasers 125 coupled to a set of fiber optical delay lines 130, where the set of fiber optical delay lines includes a number X of fiber optical delay lines 130. In certain embodiments, the field target representation is generated using only fixed time delays corresponding to M diode lasers 125 emissions through fiber optical delay lines 130. In certain embodiments, the field target representation is generated using both fixed time delays and programmable time delays, where the programmable time delays correspond to the delay of the delay timer 120. In certain embodiments, each field target point is generated by its own delay timer 120 such that N=P.

As a non-limiting example, suppose it takes 5 points to represent a tank and two tanks are to be represented, then P has a value of 10. The first field target can be a first armored tank disposed 500 meters away, and the second field target can be a second armored tank disposed 1 kilometer away. Each of the first field target (i.e., first armored tank disposed 500 m. away) and the second field target (i.e., second armored tank disposed 1 km away) is represented by a single delay timer 120 coupled to a single diode laser 125. That is, for both field targets, N=M=1. The first field target is represented by a set of five (5) fiber optical delay lines 130 that provide five (5) reflected return signal informations—meaning X=5. The second field target is represented by 5 additional delay lines 130 (total X=10). In another example, each field target could be represented by its own delay timer 120 and diode laser 125, so N=M=2. However, the same 5 fiber delay lines 130 are shared by both (X=5). Here two tanks are now represented at the same location but at different ranges (first armored tank disposed 500 m. away and the second armored tank disposed 1 km away). In the last example, both field targets could each have its own delay timer 120 and diode laser 125 so N=M=2. However each field target now has its own 5 fiber delay spools (X=10). And now two tanks can be represented at any point and any range in the LADAR field of view. Although the fiber optical delay line 130 associated with Target Source N (shown in FIG. 1A) shows a single fiber optical delay line 130, it can represent multiple fiber optical delay lines 130.

The delay timer 120 is configured to receive the trigger signal 150, and in response to the receipt, count until a specified time period elapses. In certain embodiments, the delay timer 120 establishes a countdown to determine when the specified timer period elapses. Upon the elapse of the specified time period, the delay timer 120 transmits a command signal 155 to the corresponding laser diode 125. The command signal 155 is an electrical signal. Each delay timer 120 is associated with and coupled to at least one diode laser 125. A single delay timer 120 can be coupled to multiple diode lasers 125 and can drive multiple diode lasers 125. That is, a single delay timer 120 can send a command signal 155 to each diode laser coupled to that single delay timer 120. For example, a delay timer 120 coupled to a first diode laser 125 and a second diode laser 125 can send a first command signal 155 to the first diode laser 125 and send a second command signal 155 to the second diode laser 125. Further, the delay timer 120 can transmit the first command signal 155 upon elapse of a first specified time period that corresponds to the first diode laser 125. The delay timer 120 could transmit the second command signal 155 simultaneously with the first command signal 155 to command the second diode laser 125.

The diode laser 125 is coupled to at least one fiber optical delay line 130, such as a set of X fiber optical delay lines 130. The set can include a single fiber optical delay line 130 (X=1), or the set can include multiple fiber optical delay lines 130 (X>1). The diode laser 125 receives an electrical input signal, and in response emits laser light. That is, the diode laser 125 includes a laser source that emits a laser pulse. The diode laser 125 of Field Target 1 receives the command signal 155 from the delay timer 120 as the electrical input signal, and emits laser light into a terminal end (e.g., a back end) of the set of X fiber optical delay lines 130. More particularly, the diode laser 125 emits laser light into a first terminal end of fiber optical delay lines $130_1$, $130_2$, $130_3$, ... $130_X$. The diode laser 125 of Field Target P receives the command signal 155 from the delay timer 120 as the electrical input signal, and emits light into a terminal end (e.g., a back end) of the fiber optical delay line(s) 130. More particularly, the diode laser 125 emits laser light into a first terminal end of fiber optical delay lines 130. In certain embodiments, the diode laser 125 receives a trigger signal 150 from the detector 117 as the electrical input signal. According to the specified delay time of the delay timer 120 coupled to the diode laser 125, each diode laser 125 can fire laser light at a different time. The laser light emitted from the diode laser 125 is an optical signal ultimately transmitted to the LADAR 101. The present disclosure uses a diode as a source of laser or light as an example, however, embodiments this disclosure are not limited to using a diode as the source of a laser or light, and other devices can be used as a source of laser or light.

Each fiber optical delay line 130 transmits an optical signal from a laser diode 125 to the target plane. In the example of FIG. 1A, the target plane 137 is disposed at the back end of the Faraday isolator 135. Each fiber optical delay line 130 includes two terminal ends (e.g., a back end and a front end) and a fixed length. The length of the fiber optical delay line 130 extends from one end (e.g., the back end) to the other end (e.g., the front end). The fiber optical delay line 130 transmits the laser light emitted from the diode laser 125 from one terminal end to the other terminal end. That is, fiber optical delay line 130 receives laser light into the back terminal end; then, the received laser light traverses through the entire length of the fiber optical delay line 130; and then, the fiber optical delay line 130 emits the laser light through the front terminal end of the fiber optical delay line 130. The laser light emitted through the front terminal end can be referred to as a return signal, when is ultimately received by the LADAR 101. A fixed amount of time passes while the laser light travels the length of the fiber optical delay line 130. That is, the length of the fiber optical delay line 130 corresponds to a fixed delay time established by time for light to travel through the fixed length of the line fiber optical delay 130. More particularly, light emitted from the laser diode 125 travels through the fixed length of $L_1$ of fiber optical delay line $130_1$ in fixed time $t_1$; and light emitted from the laser diode 125 travels through the fixed length of $L_2$ of fiber optical delay line $130_2$ in fixed time $t_2$. When $L_2 > L_1$, then $t_2 > t_1$. The length of the fiber optical delay line 130 can be rolled on to a spool or otherwise confined to a compact space to permit the laser diode 125, fiber optical delay line 130, and target plane to be disposed in close proximity of each other. Alternatively, a fiber delay line 130 could also be a minimal length fiber to add a minimum time delay $t_x$ if no substantial additional time delay is needed for that field point.

The target plane of the target 103 includes any suitable shape operable to successfully transmit return signals to the LADAR 101. For example, the target plane of the target 103 may include a board having one or more pinholes (not shown in FIGS. 1A-1B). FIGS. 4A-4F illustrate examples various pinhole arrangements of the target plane of the target 103. The shape, and more particularly the size, of the target plane 137 of the target 103 can be defined by requirements of the test for LADAR 101. The target plane 137 includes the front terminal end of each fiber optical delay line 130 of the portable programmable LADAR test target 100. The front terminal end of each fiber optical delay line 130 is affixed within one of the pinholes. In certain embodiments, the front terminal end of multiple fiber optical delay lines 130 are affixed within a single pinhole.

In certain embodiments, the power of the second portion of the laser pulse 105 is sufficient to cause optical signal damage to the target plane 137 of the target 103. More particularly, damage to the target plane includes damage to the line fiber optical delays 130 included. The Faraday isolator 135 may be positioned between the target plane 137 of the target 103 and the transmitter of the LADAR 101. The Faraday isolator 135 may be positioned either after (i.e., between the collimator 140 and the target plane) or before (i.e., between the LADAR 101 and the collimator 140) before the collimator 140. In this embodiment, the target 103 can be protected by the Faraday isolator 135. In certain embodiments, the target 103 may be sufficiently resilient to optical signal damage from the full power of the optical input signal 105 from the LADAR 101.

The target plane sends the return signals 110 to the LADAR 101 in a forward direction (shown by the arrow F) through the Faraday isolator 135 and the collimator 140. The collimator 140 includes a lens that receives optical signals in the forward F and reverse directions. The collimator 140 lens receives optical signals propagating in the reverse direction and reduces the size and angle spread of the beam down to the size of the focal plane of the collimator. The focal plane of the collimator 140 is substantially the same size as the target plane 137 of the target 103. The target plane 137 of the target 103 can include the focal plane of the collimator 140. The collimator 140 lens receives optical signals propagating in the forward direction F and expands the size and angle spread of the beam according to the focal length 142 of the collimator 140.

The beam splitter 115 receives a signal from the collimator 140. The beam splitter permits the signal to pass straight from the collimator 140 through the beam splitter 115 and provides the return signal 110 into the receiver of the LADAR 101. Although the beam splitter 115 does divide the return signal 110 into multiple paths, only one path is utilized.

The receiver of the LADAR 101 receives the return signal 110 or return signals 110 from the target plane of the target 103. For example, the LADAR 101 receives the return signals 110 the five points A-E corresponding to the surface to the first field target (i.e., armored tank disposed 500 meters away), and then the LADAR 101 receives the return signals 110 from the second field target (i.e., second armored tank disposed 1 km away). As an example, the electrical signal processing circuitry 102 may determine that the third position C (the front headlamp) is corresponds to a more reflective material than the fifth position E (i.e., the caterpillar tracks) based on the intensity $i_C$ of the third position C being greater than the intensity $i_E$ of the fifth position E.

FIG. 2 illustrates a portable programmable LAser Detection And Ranging (LADAR) test target including a hybrid electronic Simulated Optical Range Target (e-SORT) according to embodiments of the present disclosure. The portable programmable LADAR test target 200 shown in FIG. 2 is for illustration only. Other embodiments could be used without departing from the scope of this disclosure.

Figure 3:
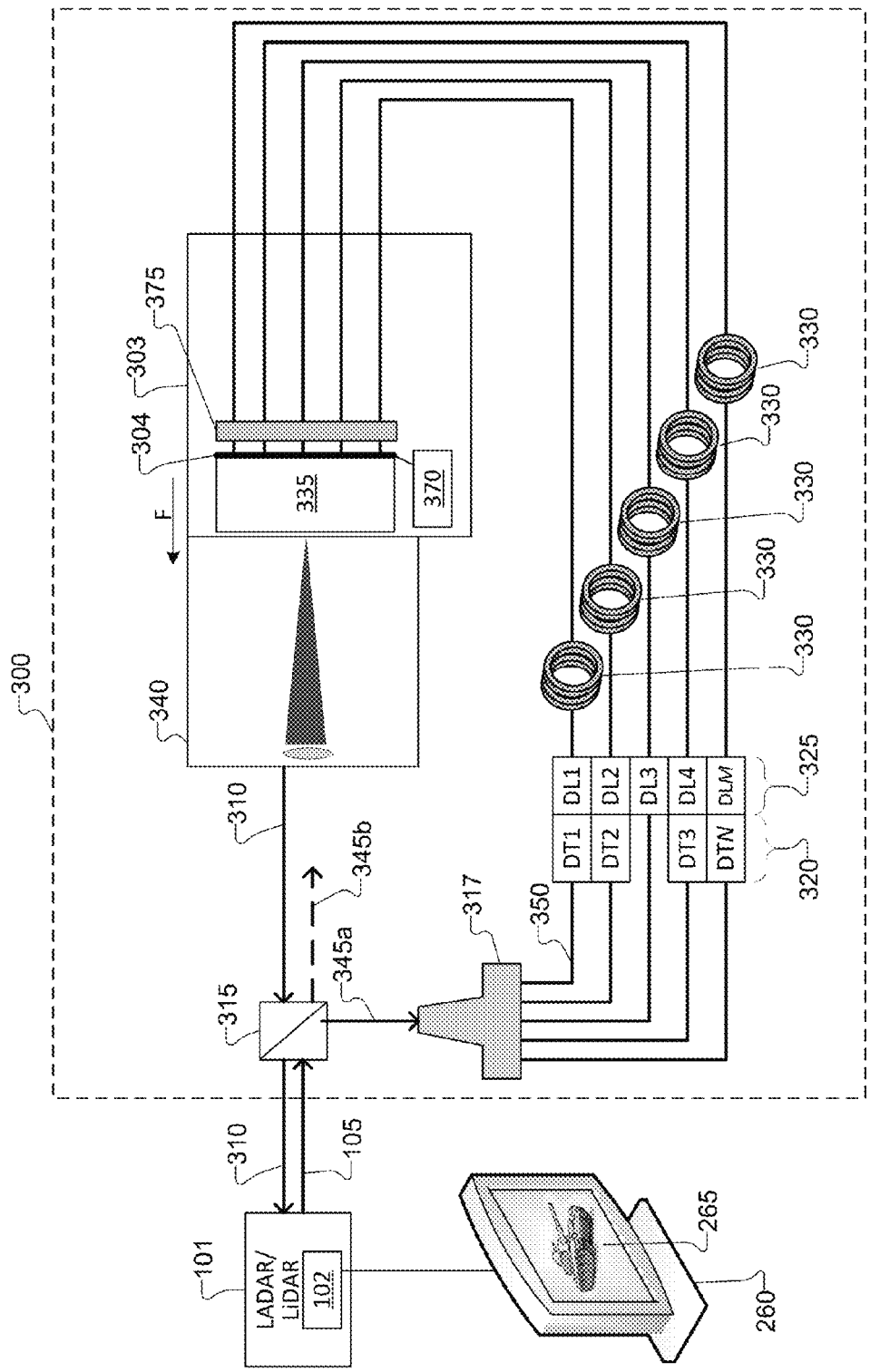
FIG. 3 illustrates a portable programmable LADAR/LiDAR test target including a hybrid electronic Simulated Optical Range Target (e-SORT) composed of multiple delay timers and laser/light sources with fiber optic delay spools according to embodiments of the present disclosure.

Note that while three test targets 100, 200, and 300 are shown in FIGS. 1A, 2, and 3, respectively, features of one test target could be used in the other test target. For instance, the test targets 100, 200 could include a connector 375. As another example, the test targets 100, 300 can include the fusion splice 205. Test target 200 includes components 215, 217, 220, 225, 230, 235, and 240 and 203, which may be similar to components 115, 117, 120, 125, 130, 135, and 140 of FIG. 1A and component 103 of FIG. 1B.

The portable programmable LADAR test target 200 in FIG. 2 includes a beam splitter 215; a detector 217; multiple of delay timers 220 (DT1, DT2, and DT3 through DTN), multiple diode lasers 225 (DL1, and DL2 through DLM), and multiple sets of fiber optic cables 230; a target plane 204 of the target 203, a Faraday isolator 235; and a collimator 240. In a non-limited specific example, the portable programmable LADAR test target 200 can be used to generate a single field target or a single field target point.

The beam splitter 215 receives the laser pulse 105 from the LADAR 101, and divides the beam of light into a first optical signal 245a including a first portion of the laser pulse 105 reflected along a path into the detector 217 and a second optical signal 245b including a second portion of the laser pulse 105 that is not reflected into the detector 217. The second optical signal 245b passes through the beam splitter and propagates through the collimator 240 in a reverse direction. The second optical signal 245b enters the front side of the Faraday isolator 235, but is strongly attenuated to prevent optical damage to the front face 204 of the target 203 at the back side of the Faraday isolator 235.

In FIG. 2, the detector 217 is configured to in response to receiving a first optical signal 245a from a LADAR 101, transmit an electrical trigger signal 250 to cause a laser diode 225 to emit a laser pulse. The detector 217 sends the same trigger signal 250 to each delay timer 220 (DT1, DT2, and DT3 through DTN) at substantially the same time.

The first delay timer DT1 is coupled to two diode lasers 225 (DL1 and DL2). In response to receiving the trigger signal 250, the first delay timer initiates a countdown of a specified delay period. For example, if a 100 nanoseconds (ns) programmed delay corresponds to the first delay period, then the first delay timer DT1 initiates a countdown of 100 ns. Then, 100 ns after receipt of trigger signal 250, the first delay timer DT1 transmits a command signal 255 to the first diode laser DL1 and the second diode laser DL2 simultaneously. In another example, a fixed 50 ns delay could be placed between DT1 and DL2 so that now 100 ns after receipt of trigger signal 250, command signal 255 is sent to the first diode laser DL1 and 150 ns after trigger signal 250 command signal 255 is sent to the second diode laser DL2. In certain circumstances, the first delay timer DT1 can send an identical command signal 255 to both diode lasers DL1 and DL2 associated with DT1.

In certain circumstances, the first delay timer DT1 can send a first command signal to the first diode laser DL1 and send a second command signal to the second diode laser DL2, where the first and second command signals are different. As an example, the first command signal can control the reflected return signal information of a first point A of the field target; the second command signal can control the reflected return signal information of a second point B of the field target. Also, the first command signal can instruct the first diode laser DL1 to emit light at an intensity level (for example, $i_A$) and the second command signal can instruct the second diode laser DL2 to emit light at an intensity level (for example, $i_B$). According to the various embodiments, the intensity levels can be the same ($i_A=i_B$) or different ($i_A \neq i_B$), depending on the points selected to represent the field target.

The second delay timer DT2, third delay timer DT3, and fourth delay timer DT4 are coupled to a single diode laser DLM, such as via a fusion splice 205. In response to receiving the trigger signal 250, the second delay timer DT2 initiates a countdown of a third specified delay period (e.g., 350 ns) corresponding to the diode laser DLM. At the same time, in response to receiving the trigger signal 250, the third delay timer DT3 initiates a countdown of a fourth specified delay period (e.g., 700 ns) corresponding to the diode laser DLM. At the same time, in response to receiving the trigger signal 250, the fourth delay timer DTN (i.e., N=4) initiates a countdown of a fifth specified delay period (e.g., 900 ns) corresponding to the diode laser DLM. For example, the second delay timer DT2 transmits a third command signal 255 to the diode laser DLM via the fusion splice 205 upon elapse of the 350 ns third specified delay period. The third delay timer DT3 transmits a fourth command signal 255 to the diode laser DLM via the fusion splice 205 upon elapse of the 700 ns fourth specified delay period. The fourth delay timer DTN transmits a fifth command signal 255 to the diode laser DLM via the fusion splice 205 upon elapse of the 900 ns fifth specified delay period.

The first diode laser DL1 is coupled to a single set of X fiber optical delay lines. In response to receiving the first command signal 255 from the first delay timer DT1, the first diode laser DL1 transmits laser light at an intensity level indicated in the first command signal. The second diode laser DL2 is coupled to a single set of X fiber optical delay lines. In the example shown, the single set of X fiber optical delay lines coupled to the second diode laser DL2 includes the same number of fiber optical delay lines as the set coupled to the DL1. In certain embodiments, the single set of X fiber optical delay lines coupled to the second diode laser DL2 may include a different number of fiber optical delay lines than the set coupled to the DL1. In response to receiving the second command signal 255 from the second delay timer DT2, the second diode laser DL2 transmits laser light at an intensity level indicated in the second command signal. The diode laser DLM is coupled to a single set of X=3 fiber optical delay lines 230. In response to receiving the a command signal 255 from either associated delay timer (DT2, DT3, or DTN) the diode laser DLM transmits laser light at an intensity level indicated in the received command signal. For example, the command signal received by the diode laser DLM can control the reflected return signal information of third, fourth, and fifth points C, D, and E of the field target. More particularly, the third command signal alone from the second delay timer DT2 can be the command signal received by the diode laser DLM and used to control the reflected return signal information of third, fourth, and fifth field target points C, D, and E of the field target. Likewise, the fourth command signal alone from the third delay timer DT3 can be the command signal received by the diode laser DLM and used to control the reflected return signal information of third, fourth, and fifth points C, D, and E of the field target. Equally, the fifth command signal alone from the fourth delay timer DTN can be the command signal received by the diode laser DLM and used to control the reflected return signal information of third, fourth, and fifth points C, D, and E of the field target.

The target plane 204 of the target 203 includes a board having one or more pinholes. In the example shown, the target plane 204 includes five pinholes, each corresponding to a field target point. The front terminal end of each fiber optical delay line 230 is affixed within one of the pinholes. As an example, the fiber optical delay lines 230 associated with the first laser diode DL1 are affixed within a pinhole corresponding to the first field target point A. The fiber optical delay lines 230 associated with the second laser diode DL2 are affixed within a pinhole corresponding to the second field target point B. The three (3) fiber optical delay lines 230 associated with the third laser diode DLM are each affixed within pinholes corresponding to the third, fourth, and fifth field target points C, D, and E, respectively.

The front terminal end 207 of each fiber optical delay line 230 in the set of X fiber optical delay lines 230 coupled to the second diode laser DL2 is affixed within a pinhole of the target plane 204. As an example, the fiber optical delay lines 230 associated with the first laser diode DL1 are affixed within a pinhole corresponding to the first field target point A.

The electrical signal processing circuitry 102 of the LADAR 101 can be coupled to a display 260 and control the display 260 to display an image 265 of the perceived field target based on the information received in the return signal transmission 210. The image 265 should closely resemble the P field target points in the target 203.

FIG. 3 illustrates a portable programmable LAser Detection And Ranging (LADAR) test target including a hybrid electronic Simulated Optical Range Target (e-SORT) according to embodiments of the present disclosure. The portable programmable LADAR test target 300 shown in FIG. 3 is for illustration only. Other embodiments could be used without departing from the scope of this disclosure.

The portable programmable LADAR test target 300 includes a beam splitter 315; a detector 317; multiple of delay timers 320 (DT1, DT2, and DT3 through DTN), multiple diode lasers 325 (DL1, DL2, DL3, and DL4 through DLM), and one set of fiber optical cables 330 per diode laser 325; a target 303; and a collimator 340. In a non-limited specific example, the portable programmable LADAR test target 300 can be used to generate a single field target, such as the armored tank in FIG. 1B. Test target 300 includes components 315, 317, 320, 325, 330, 335, and 340 and 303, which may be similar to components 115, 117, 120, 125, 130, 135, and 140 of FIG. 1A and component 103 of FIG. 1B.

The beam splitter 315 receives the laser pulse 105 from the LADAR 101, and divides the beam of light into a first optical signal 345a including a first portion of the laser pulse 105 reflected along a path into the detector 317 and a second optical signal 345b including a second portion of the laser pulse 105 that is not reflected into the detector 317. The beam splitter 315 receives the return signal 310 from the collimator 340. The beam splitter permits the return signal 310 to pass straight from the collimator 340 through the beam splitter 315 and into the receiver of the LADAR 101. The beam splitter 315 does divide the return signal 310 into multiple paths but only utilizes the one path.

The portable programmable LADAR test target 300 includes a diode laser DL3 coupled to the detector 317 and a set of X fiber optical delay lines 330. The diode laser DL3 receives a trigger signal 350 from the detector 317, and in response (i.e., immediately), emits laser light into the X fiber optical delay lines 330 coupled to the diode laser DL3.

The target 303 includes a target plane 304, a Faraday isolator 335 coupled to the front of the target plane 304, a rotating machine 370 coupled to the front of the target plane 304, and a connector 375 that couples the front terminal end of each fiber optical delay line 330 to the target plane 304. The connector 375 can be a mechanical coupler, an adhesive material, or a fusion material. The connector 375 affixes each front terminal end of each fiber optical delay line 330 within a pinhole of the target plane 304 and flush with each other.

The rotating machine 370 rotates the target plane 304 and collimator 340 to angularly displace the pinholes and the front terminal end of each fiber optical delay lines 330 affixed within. Alternately, a translation machine 370 could translate the target plane with a fixed collimator to provide an angular displacement of the pinholes with respect to the LADAR field of view.

FIGS. 4A-4F illustrate examples of various pinhole arrangements of the target plane of the target 103, 203, 303. Other embodiments could be used without departing from the scope of this disclosure.

Figure 4A:
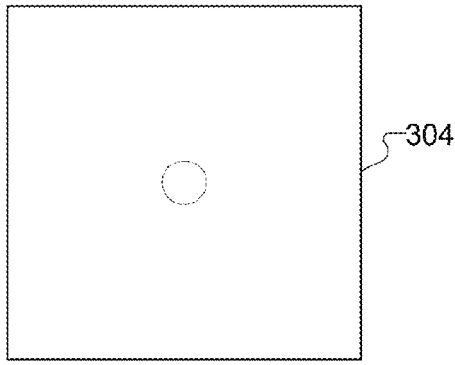
FIGS. 4A-4F illustrate examples of various pinhole arrangements of the target plane of the target to create basic LADAR/LiDAR test patterns according to embodiments of the present disclosure.

FIG. 4A illustrates that target plane 304 can include a boresight pinhole arrangement. The pinhole can include one or more front terminal ends of fiber optical delay lines 330. The boresight pinhole arrangement enables the portable programmable LADAR test target 100, 200, 300 to emit return signals from the pinhole at different times, which causes the LADAR 101 to perceive a targeted object having various depths. The boresight pinhole arrangement enables the portable programmable LADAR test target 100, 200, 300 to emit return signals from the pinhole at different intensities, which causes the LADAR 101 to perceive a targeted object having various surface materials, where the surface materials have various reflective properties.

Figure 4B:
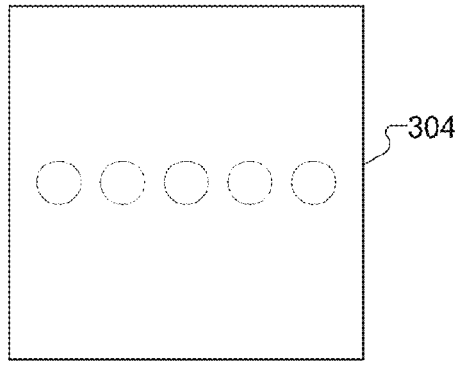

FIG. 4B illustrates that target plane 304 can include a greyscale pinhole arrangement. The pinholes can include one or more front terminal ends of fiber optical delay lines 330. The greyscale arrangement of pinholes includes pinholes disposed a various heights along the x-axis. The range arrangement enables the portable programmable LADAR test target 100, 200, 300 to emit return signals from each pinhole at a same time, which causes the LADAR 101 to perceive a targeted object having various widths. The range arrangement enables the portable programmable LADAR test target 100, 200, 300 to emit return signals from each pinhole at a different time, which causes the LADAR 101 to perceive a targeted object having various widths and depth. The rotating machine 370 can rotate the target plane 304 by any angle, such as +90 degrees, to spatially displace the non-centered pinholes.

Rotation of the line of site of the target plane 304 angularly translates (i.e., rotates) the position of the pinholes with respect to the x-y plane of the line of site of the LADAR receiver. That is, the angular translation of the line of site of the target plane 304 causes the LADAR line of site to receive return transmissions from a different angle and from a different location. A LADAR test target, such as test target 300, can rotate the line of site of the target plane in at least two ways. First, the test target 300 can linearly translate the target plate with respect to the position of the collimator 340. Second, the test target 300 can rotate the target plane 304 and the collimator 340 as a unit—maintaining same position of the test target plane 304 with respect to the position of the collimator 340.

Figure 4E:
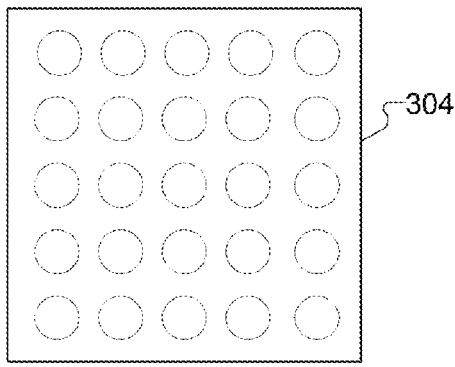
Figure 4C:
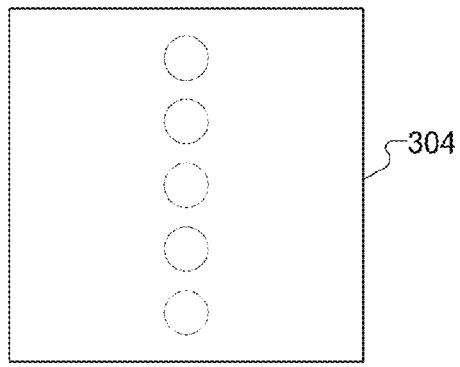

FIG. 4C illustrates that target plane 304 can include a range arrangement of pinholes. The pinholes can include one or more front terminal ends of fiber optical delay lines 330. The range arrangement of pinholes includes pinholes disposed a various heights along the y-axis. The range arrangement enables the portable programmable LADAR test target 100, 200, 300 to emit return signals from each pinhole at a same time, which causes the LADAR 101 to perceive a targeted object having various height. The range arrangement enables the portable programmable LADAR test target 100, 200, 300 to emit return signals 110 from each pinhole at a different time, which causes the LADAR 101 to perceive a targeted object having various height and depth.

Figure 4D:
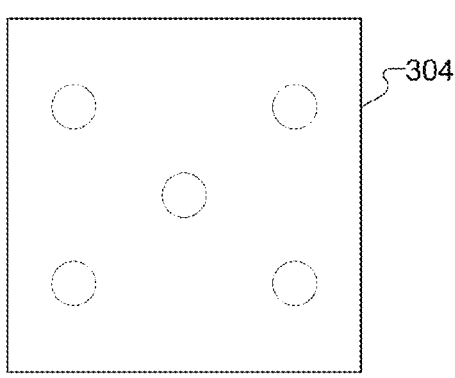

FIG. 4D illustrates that target plane 304 can include a spatial pinhole arrangement. In certain embodiments, the fiber optical delay line 330 within each pinhole is controlled by a separate diode laser. In certain embodiments, the fiber optical delay line 330 within each pinhole is controlled by a single diode laser coupled to a set of X=5 fiber optical delay lines 330, where each of the fiber optical delay lines 330 has a different fixed length and corresponding fixed delay. The spatial pinhole arrangement includes a center pinhole, and upper left pinhole, an upper right pinhole, a lower left pinhole, and a lower right pinhole. The various heights of the pinholes along the y-axis enable enables the portable programmable LADAR test target 100, 200, 300 to emit return signals from each pinhole, which causes the LADAR 101 to perceive a targeted object having various heights. The various distances of the pinholes along the x-axis enables the portable programmable LADAR test target 100, 200, 300 to emit return signals from each pinhole, which causes the LADAR 101 to perceive a targeted object having various widths. The spatial arrangement enables the portable programmable LADAR test target 100, 200, 300 to emit return signals 110 from each pinhole at a different time, which causes the LADAR 101 to perceive a targeted object having various height, width, and depth.

FIG. 4E illustrates that target plane 304 can include a combination of boresight, spatial, range, and 3D greyscale pinhole arrangements. For example, the target plane can include an array of pinholes disposed in a number of columns and rows. Each row can be controlled by a single diode laser coupled to each of the fiber optical delay lines 330 within that row. In certain embodiments, each column can be controlled a single diode laser coupled to each of the fiber optical delay lines 330 within that column. In certain embodiments, the fiber optical delay line 330 within each pinhole is controlled by a separate diode laser.

Figure 4F:
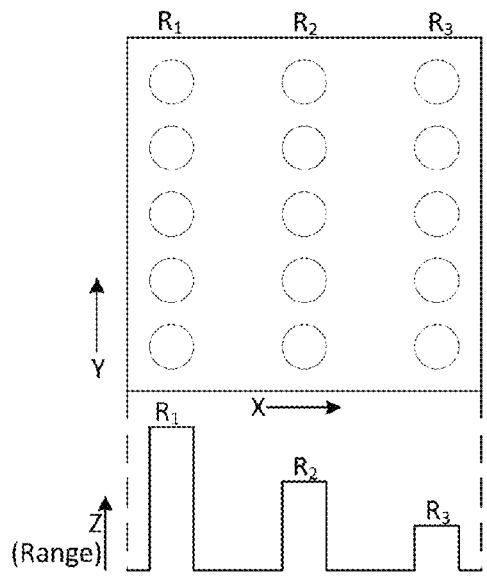

FIG. 4F illustrates that the target plane 304 can include an array of pinholes can be used to generate a target having two or more bars. For example, the target plane 304 can generate a visual image test target (also referred to as a "3 bar target") and thermal image test target (also referred to as a "4 bar target"). Each pinhole includes a second end of a fiber optical delay line that can cause a LADAR, such as the LADAR 101 to generate a pixel for the perceived image, for example, the image 265. As shown, the example of FIG. 4F, the first column includes five pinholes aligned at a common position in the x-direction (shown by the arrow X) of the LADAR line of site (LOS), and each pinhole generates a pixel corresponding to a first range ($R_1$) in the positive z-direction (shown by the arrow Z) at various heights in the y-direction (shown by the arrow Y). The second, middle column includes five pinholes aligned at a common position in the x-direction of the LADAR LOS, and each pinhole generates a pixel corresponding to a second range ($R_2$) in the positive z-direction at various heights in the y-direction. Likewise, the third column includes five pinholes aligned at a common position in the x-direction of the LADAR LOS, and each pinhole generates a pixel corresponding to a third range ($R_3$) in the positive z-direction at various heights in the y-direction. As a specific and non-limiting example, the range $R_1$ of the first column is greater than the range $R_2$ of the middle column, which is greater than the distance of the third range $R_3$. That is, the receiver of the LADAR, such as LADAR 101, perceives the greatest range value $R_1$ to be furthest away, compared with the lesser values of $R_2$ and $R_3$ in the positive z-direction. Also, the greater the time delay, the greater the range value, the farther away the target is perceived to be from the LADAR 101.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A method of testing a detection and ranging system, the method comprising:
   receiving an input signal from a detection and ranging system,
   triggering a light source to output a pulse;
   transmitting the pulse into a first end of a plurality of fiber optical delay lines for passage through a length of each fiber optical delay line of the plurality of fiber optical delay lines; and
   transmitting the pulse out through a second end of each fiber optical delay line of the plurality of fiber optical delay lines,
   wherein each second end of the plurality of fiber optical delay lines is arranged within a target plane, the pulse output yielding return signal transmissions from the target plane to the detection and ranging system and ranges generated at two or more locations,
   wherein each of the return signal transmissions is delayed by at least a time for the pulse to traverse the length of the respective fiber optical delay line.

2. The method of claim 1, wherein one of: the detection and ranging system is a Laser Detection And Ranging (LADAR) system or LIght Detection And Ranging (LiDAR) system, and
   wherein when the detection and ranging system is a Laser Detection And Ranging (LADAR) system, the input signal is a laser signal, the light source is a laser source configured to emit the pulse and the pulse is a laser pulse; and
   wherein when the detection and ranging system is a LIght Detection And Ranging (LiDAR) system, the input signal is a light signal, the light source is a light diode configured to emit the pulse and the pulse is a light pulse.

3. The method of claim 1, wherein the input signal comprises an optical signal; and
   wherein the method further comprises:
      dividing the optical signal into a first optical signal and a second optical signal, the first optical signal comprising a first portion of the optical signal, and the second optical signal comprising a second portion of the optical signal; and
      receiving, by a detector, the first optical signal.

4. The method of claim 3, further comprising:
   receiving the second optical signal in a reverse direction;
   receiving the pulse outputs from the target plane in a forward direction;
   blocking the second optical signal from the target plane by attenuating signals in the reverse direction;
   transmitting the pulse outputs in the forward direction with minimal attenuation.

5. The method of claim 1, further comprising:
   in response to receiving the input signal, triggering the light source to output the pulse upon elapse of a specified delay period.

6. The method of claim 5, wherein triggering the light source to output the pulse upon elapse of the specified delay period further comprises triggering the light source to output the pulse at a specified intensity level.

7. The method of claim 1, further comprising:
   collimating the laser pulse outputs from the target plane, yielding the return signal transmissions from a collimator to the detection and ranging system, wherein the target plane includes a focal plane of the collimator.

8. The method of claim 1, further comprising:
   translating the target plane line of sight to spatially displace a x-y coordinates of the second end of the fiber optical delay lines angularly relative to the detection and ranging system.

9. A test target for a Laser Detection And Ranging (LADAR) system or LIght Detection And Ranging (LiDAR) system, the test target comprising:
   a detector configured to in response to receiving a first optical signal from a rangefinder transmit a trigger signal to cause a source to emit a pulse;
   a first source coupled to the detector and to a set of X fiber optical delay lines and configured to in response to receiving one of: a command signal or a trigger signal, output the pulse into a first end of the set of fiber optical delay lines;
   the set of X fiber optical delay lines, wherein each fiber optical delay line is configured to transmit the pulse through a respective length of the fiber optical delay line and out of a second end of the fiber optical delay line upon elapse of a fixed time delay during which the pulse traverses the respective length of the fiber optical delay; and
   a target plane configured to transmit a return signal to the rangefinder, the target plane comprising:
      a pinhole arrangement according to x-y coordinates of the target plane, and
      the second end of each of the fiber optical delay lines affixed within a respective pinhole, wherein the a return signal comprises the output from the second end of each of the X fiber optical delay lines.

10. The test target of claim 9, wherein when the rangefinder is a LADAR system, the first optical signal is a laser signal, the first source is a laser source, and the pulse is a laser pulse; and wherein when the rangefinder is a LiDAR system, the first optical signal is a light signal, the first source is a light source, and the pulse is a light pulse.

11. The test target of claim 9, wherein the set of X fiber optical delay lines comprises a first fiber optical delay line and a second fiber optical delay line, the first fiber optical delay line having a different length than the second fiber optical delay line.

12. The test target of claim 11, further comprising:
a beam splitter configured to:
receive an input signal from the rangefinder, the input signal comprising an optical signal,
divide the optical signal into the first optical signal and a second optical signal, the first optical signal comprising a first portion of the optical signal, and the second optical signal comprising a second portion of the optical signal.

13. The test target of claim 12, further comprising:
an optical isolator configured to:
receive the second optical signal in a reverse direction;
receive the a return signal output from the target plane in a forward direction;
blocking the second optical signal from the target plane by attenuating signals in the reverse direction;
transmitting the a return signal in the forward direction.

14. The test target of claim 13, wherein the optical isolator comprises a Faraday isolator.

15. The test target of claim 9, further comprising:
N delay timers, each delay timer coupled to a corresponding source and configured to in response to receiving the trigger signal, transmit a command signal to the corresponding source upon elapse of a specified time period.

16. The test target of claim 15, wherein at least one of the N delay timers is further configured transmit the command signal indicating a specified intensity level of light to the corresponding source, and
wherein the corresponding source is further configured to in response to receiving the command signal indicating a specified intensity level, output the pulse at the specified intensity level.

17. The test target of claim 15, wherein the N delay timers comprise a first delay timer coupled to a plurality of sources, the first delay timer configured to in response to receiving the trigger signal:
transmit a first command signal to the first source upon elapse of a first specified time period, and
transmit a second command signal to a second source upon elapse of a second specified time period.

18. The test target of claim 17, further comprising a translating machine configured to translate the target plane line of sight angularly with respect to the rangefinder line of sight at a time that occurs after the target plane transmits a first return signal delayed by the first specified time period yet before the target plane transmits a second return signal delayed by the second specified time period.

19. The test target of claim 15, wherein the N delay timers comprise:
a first delay timer coupled to the first source and configured to in response to receiving the trigger signal, transmit a first command signal to the source upon elapse of a first specified time period; and
a second delay timer coupled to a first delay line and configured to in response to receiving the trigger signal, transmit a second command signal to the first delay line upon elapse of a second specified time period different from the first specified time period.

20. The test target of claim 15, wherein the N delay timers comprise:
a first delay timer coupled to the first source and configured to in response to receiving the trigger signal, transmit a first command signal to the source upon elapse of a first specified time period; and
a second delay timer coupled to the first source and configured to in response to receiving the trigger signal, transmit a second command signal to the source upon elapse of a second specified time period different from the first specified time period.

21. The test target of claim 9, further comprising:
a collimator configured to collimate the return signal and forward the collimated return signal to the rangefinder,
wherein the target plane includes a focal plane of the collimator, and
wherein the focal plane and target plane have substantially a same sized dimensions.

22. The test target of claim 9, further comprising:
a translating machine configured to rotate the target plane line of sight to angularly displace the position of the x-y coordinates of the second end of each of the fiber optical delay lines relative to the rangefinder line of sight.

* * * * *